US009894102B2

(12) United States Patent
Avesand et al.

(10) Patent No.: US 9,894,102 B2
(45) Date of Patent: Feb. 13, 2018

(54) SYSTEM AND METHOD FOR PRIORITY-BASED RULE GENERATION WITH CONSISTENCY CHECK AND POLICY ENFORCEMENT

(71) Applicant: Telefonaktiebolaget LM Ericsson (publ), Stockholm (SE)

(72) Inventors: Stefan Avesand, Huddinge (SE); Elena Fersman, Stockholm (SE); Leonid Mokrushin, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

(21) Appl. No.: 14/917,539

(22) PCT Filed: Sep. 19, 2013

(86) PCT No.: PCT/IB2013/058676
§ 371 (c)(1),
(2) Date: Mar. 8, 2016

(87) PCT Pub. No.: WO2015/040456
PCT Pub. Date: Mar. 26, 2015

(65) Prior Publication Data
US 2016/0226915 A1    Aug. 4, 2016

(51) Int. Cl.
*G06F 17/00* (2006.01)
*H04L 29/06* (2006.01)
*H04W 4/00* (2009.01)
*H04L 12/24* (2006.01)
*H04L 12/851* (2013.01)
*G06N 5/02* (2006.01)
(Continued)

(52) U.S. Cl.
CPC .......... *H04L 63/20* (2013.01); *H04L 41/0869* (2013.01); *H04L 41/0893* (2013.01); *H04W 4/001* (2013.01); *G06N 5/025* (2013.01); *H04L 41/0873* (2013.01); *H04L 47/10* (2013.01); *H04L 47/20* (2013.01); *H04L 47/2441* (2013.01); *H04M 1/72563* (2013.01)

(58) Field of Classification Search
CPC . H04L 63/20; H04L 41/0873; H04L 41/0893; H04L 47/10; H04L 47/20; H04L 47/2441; G06N 5/025
See application file for complete search history.

(56) References Cited

U.S. PATENT DOCUMENTS 6,381,639 B1 *  4/2002  Thebaut ................. G06F 21/30
                                                               709/221
7,139,817 B1    11/2006  English et al.
(Continued)

OTHER PUBLICATIONS

International Search Report and Written Opinion of the International Searching Authority, Application No. PCT/IB2013/058676, dated Apr. 1, 2014.

*Primary Examiner* — Jayesh Jhaveri
(74) *Attorney, Agent, or Firm* — Sage Patent Group

(57) ABSTRACT

A network node receives rules from a plurality of different domain entities. Each domain entity has a different priority level, and each rule defines an action to be performed be a device in response to a predetermined event. The network node prioritizes the rules based on the priority levels of their respective domain entities, checks for conflicts between the prioritized rules, and generates a policy based on the prioritized rules.

22 Claims, 9 Drawing Sheets

(51) Int. Cl.
    *H04L 12/801*     (2013.01)
    *H04L 12/813*     (2013.01)
    *H04M 1/725*     (2006.01)

(56) References Cited

U.S. PATENT DOCUMENTS

| | | | |
|---|---|---|---|
| 8,375,136 B2* | 2/2013 | Roman | H04L 41/0213 709/220 |
| 8,924,543 B2* | 12/2014 | Raleigh | H04L 12/14 455/414.1 |
| 9,378,359 B2* | 6/2016 | Qureshi | G06F 21/53 |
| 2005/0276262 A1* | 12/2005 | Schuba | G06N 5/025 370/389 |
| 2009/0049518 A1* | 2/2009 | Roman | H04L 41/0893 726/1 |
| 2012/0108225 A1 | 5/2012 | Luna et al. | |
| 2012/0166604 A1* | 6/2012 | Fortier | H04L 41/0893 709/223 |
| 2014/0130119 A1* | 5/2014 | Goldschlag | H04L 63/20 726/1 |
| 2017/0126494 A1* | 5/2017 | Chan | H04L 41/0809 |

\* cited by examiner

FIG. 1A (PRIOR ART)

| DEVICE BEHAVIOR | MANUFACTURER-DEFINED ACTION |
|---|---|
| POWER BUTTON DEPRESSED FOR >= 3 SECONDS | RESTART LAPTOP |
| BATTERY POWER LEVEL <= 10% | RENDER AUDIO AND/OR VISUAL NOTIFICATION TO USER |
| BATTERY POWER LEVEL <= 3% | SAVE ALL MODIFIED CONTENT TO THE HARD DRIVE |

FIG. 1B (PRIOR ART)

| DEVICE BEHAVIOR | USER-DEFINED ACTION |
|---|---|
| DETECT LID IN THE CLOSED POSITION | ENTER SLEEP MODE |
| BRIGHTNESS OF AMBIENT LIGHT EXCEEDS PREDETERMINED THRESHOLD | AUTOMATICALLY INCREASE BRIGHTNESS LEVEL OF DISPLAY |
| BATTERY POWER LEVEL <= 5% | AUTOMATICALLY DECREASE BRIGHTNESS LEVEL OF DISPLAY |

# SYSTEM AND METHOD FOR PRIORITY-BASED RULE GENERATION WITH CONSISTENCY CHECK AND POLICY ENFORCEMENT

CROSS REFERENCE TO RELATED APPLICATION

This application is a 35 U.S.C. § 371 national stage application of PCT International Application No. PCT/IB2013/058676, filed on Sep. 19, 2013, the disclosure and content of which is incorporated by reference herein in its entirety. The above-referenced PCT International Application was published in the English language as International Publication No. WO 2015/040456 A1 on Mar. 26, 2015.

FIELD OF THE INVENTION

The present disclosure is related generally to systems and methods of policy construction, and more particularly, to systems and methods for constructing and adapting policies to the diverse requirements of multiple domain entities based on the priority levels of the domain entities.

BACKGROUND

Historically, device manufacturers have created policies or rules to control the behavior of their devices under certain conditions. From an end-user's point of view, such policies may be "fixed" policies that only the manufacturers can change, or "flexible" policies that define user-configurable actions or behaviors for the device.

FIGS. 1A-1B, for example, show a pair of tables 10a, 10b, illustrating some policies defined for a consumer electronic device, such as a laptop computing device, for example. As is known in the art, the information in these tables is generally stored in the memory of the device, and the actions are performed by the device responsive to detecting a corresponding event. Table 10a particularly illustrates some example fixed policies defined by the manufacturer, while table 10b illustrates some example flexible policies that are configured by the user. Note that flexible policies seen in table 10a are often times referred as "user preferences," and may initially be undefined and provisioned entirely by the end user. Alternatively, the manufacturer may initially define one or more default actions for the table 10b that are later altered by the manufacturer or user.

The importance of such "fixed" and "flexible" policies is steadily increasing as the number of inter-communicating devices grows larger. Particularly, multiple different domain entities, such as the manufacturer, the government, a company, and a user, for example, may have an interest in controlling a given device to perform particular actions responsive to detecting some predefined events or conditions. Thus, each domain entity may set its own policy to define those events and actions. Together, the individual policies of the domain entities control how the device behaves under certain conditions.

FIG. 2, for example, illustrates a policy 20 comprising the individual policies 22, 24, 26, 28, of a plurality of domain entities. Particularly, a first domain entity, which may be the manufacturer of the device, sets the basic rules and policies 22 for the device that would prevent injury to a user and guard against the inadvertent loss of data. A second domain entity, which might be a local or federal government entity, would specify the policies 24 that control operation of the device within a specific jurisdiction. A third domain entity, which could be a company or corporate entity that owns the device, may set policies 26 prohibiting an end user from using the device to visit certain types of web sites. A fourth domain may be the end user who defines policies 28 with respect to certain user preferences.

Each of these domain entities, therefore, specifies its own set of individual policies 22, 24, 26, 28 that, together, control the device. Further, each of the individual policies may be different for different vertical sectors, such as the health sector, the insurance sector, the legal sector, the utility sector, and the like. Additionally, 3rd party developers are often encouraged to build applications that must adhere to the defined policies within the different vertical sectors. Thus, different individual policies should not conflict with one another.

As a practical example, consider a device associated with the health industry that is being distributed in different countries. The manufacturer of the device might set policies describing the basic requirements for the device, such as those that enhance human safety and prevent loss of data. The governments of the countries in which the devices are distributed may also impose policies that ensure the device does not run afoul of any local regulations or ordinances. Additionally, when a device is used or issued by a specific enterprise, such as a hospital, for example, that enterprise may define a set of policies to restrict its use for company purposes only. Finally, a user of the device, such as a nurse or a doctor, might define one or more user-specific policies for the device, such as define a particular ringtone.

Another example is within the utility industry. Specifically, an electric meter delivered by the manufacturer to a user's house may include a basic set of rules set by the manufacturer. The government may also add policies defining how such meters operate within a specific jurisdiction. A service provider can then augment this initial set of policies with its own more specific policies before the meter gets distributed to the end users. Note that each policy can be developed by $3^{rd}$ parties for each of the domain entities.

SUMMARY

Embodiments of the present disclosure provide a centralized network-based node and corresponding method for ensuring the consistency of the rules that are used to generate an integrated policy for controlling a device.

In one embodiment, a method for generating policies is performed at a network node and comprises receiving first and second rules from respective first and second domain entities. Each rule defines one or more actions to be performed by the device responsive to detecting a predetermined event. Further, each domain entity has an associated predefined priority level relative to other domain entities. In this embodiment, the method determines whether a conflict exists between the first and second rules based on the predefined priority levels of the first and second domain entities, and then generates a policy for the device based on the first and second rules.

In another embodiment, the present disclosure provides a network node for generating policies for a device. In this embodiment, the network node comprises a communications interface and a programmable processor. The communications interface receives first and second rules from respective first and second different domain entities. Each rule defines one or more actions to be performed by the device responsive to detecting a predetermined event, and each domain entity has an associated predefined priority level relative to other domain entities.

The programmable processor is configured to determine whether a conflict exists between the first and second rules based on the predefined priority levels of the first and second domain entities, and to generate a policy for the device based on the first and second rules.

In a third aspect, the present disclosure provides a computer readable medium configured to store program instructions that, when executed by a processor at a network node, configures the network node to receive first and second rules from respective first and second domain entities. Each rule defines one or more actions to be performed by a device responsive to detecting a predetermined event, and each domain entity has an associated predefined priority level relative to other domain entities. The instructions also configure the network node to determine whether a conflict exists between the first and second rules based on the predefined priority levels of the first and second domain entities, and generate a policy for the device based on the first and second rules.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIGS. 1A-1B are tables illustrating device behaviors and corresponding actions defined by a manufacturer domain entity and a user domain entity.

DETAILED DESCRIPTION

The present disclosure provides a system and method for generating an integrated policy from a plurality of individual rules, and ensuring that the individual rules do not conflict with one another when generating the integrated policy. More particularly, each of the individual rules is defined by a different domain entity and governs or controls how a device will perform responsive to a predetermined event. Domain entities are entities that are generally trusted to control a given device, and may include, but are not limited to, the manufacturer of the device, the government(s) of the jurisdictions in which the device will operate, an enterprise or company that owns the device, and an end-user that will use the device. In accordance with one or more embodiments, each of the individual rules is processed to generate the integrated policy such that the integrated policy satisfies the requirements of the different domain entities.

To help ensure that the rules of different entities do not conflict with one another, each domain entity has an associated predefined priority level relative to the other domain entities. For example, a manufacturer may have the highest priority level, followed by the government, the enterprise or company, and finally the end-user. The individual rules are processed according to this priority order to ensure that no single rule conflicts with any other rule in the integrated policy. More particularly, as described in more detail below, rules are compared to each other to determine whether a conflict exists. If no conflict exists, then the rules are used in generating the integrated policy. However, if a conflict exists, only the rule associated with the higher priority entity is used to generate the integrated policy. Once the integrated policy is generated, it can be applied to different devices in different vertical industries or market sectors such as the health industry, the transportation industry, the utilities industry, and the security and safety industries.

Figure 2:
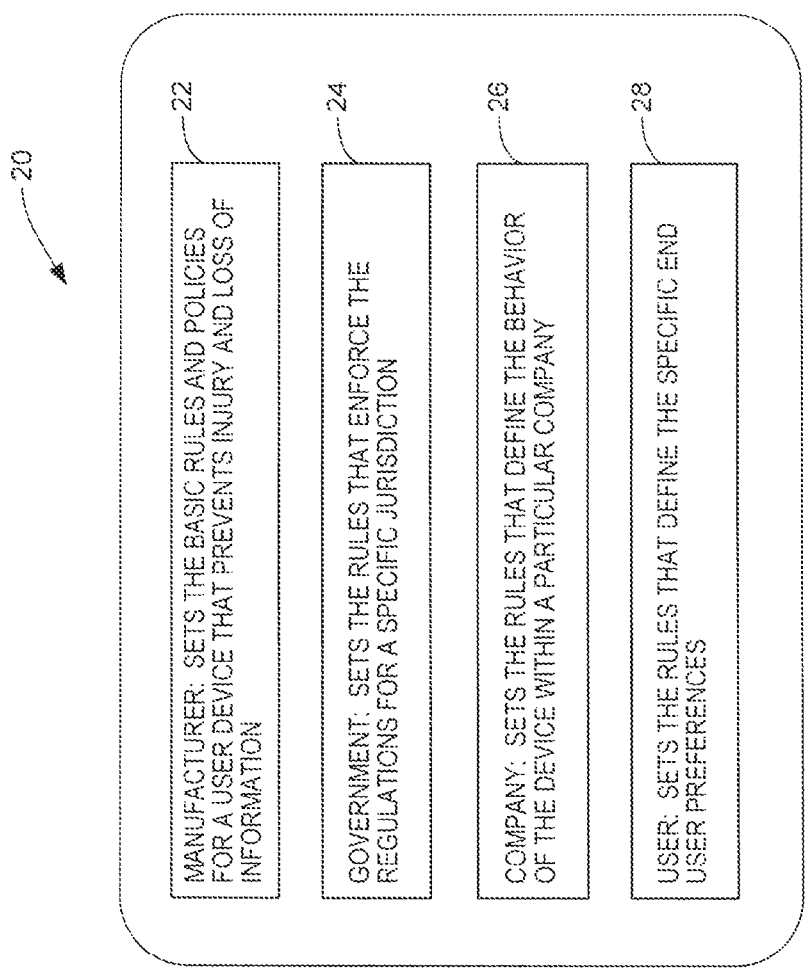
FIG. 2 is a block diagram illustrating a policy configured with a plurality of different rules for a device.
Figure 3:
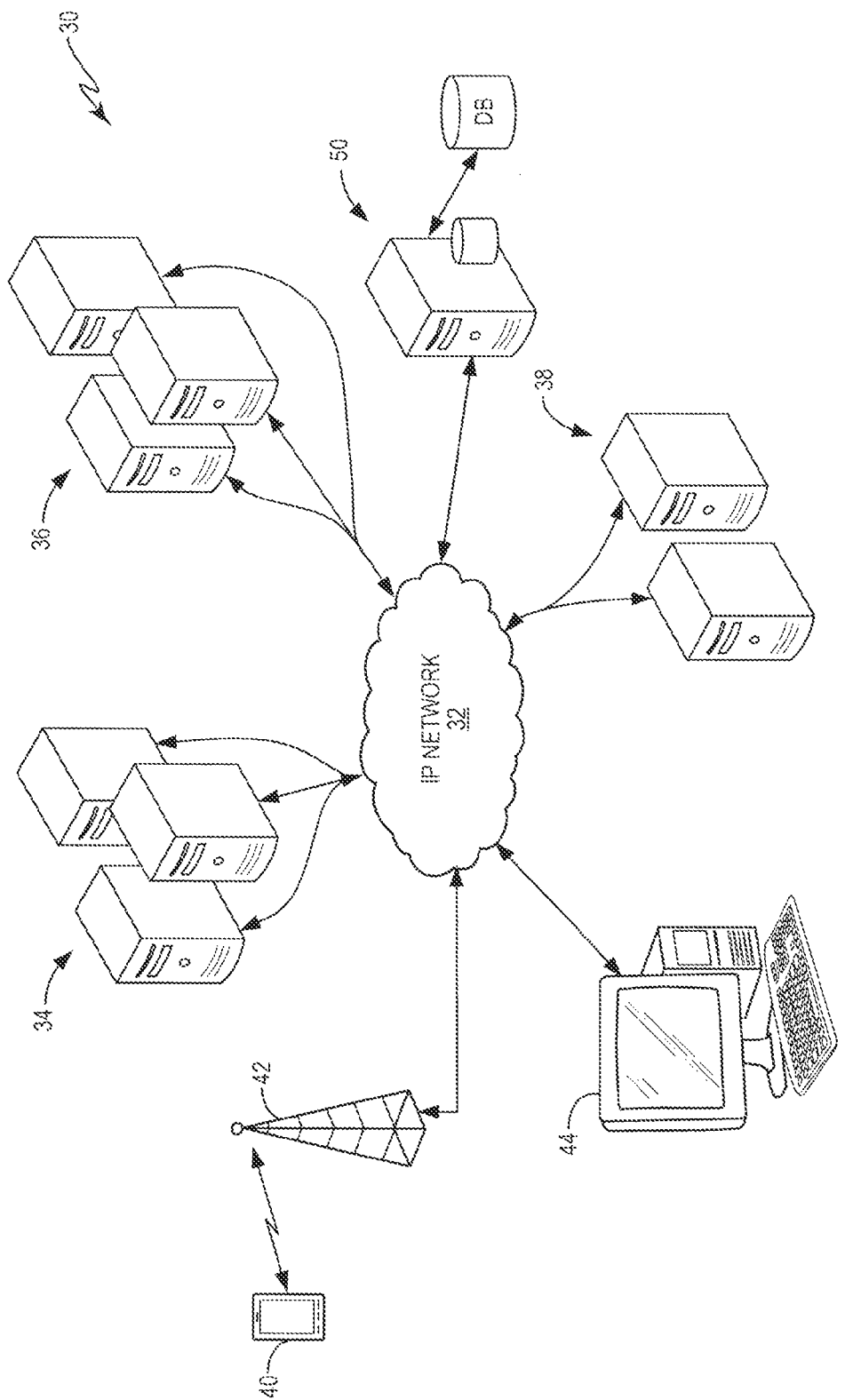
FIG. 3 is a block diagram illustrating some components of a communications system configured according to one embodiment of the present disclosure.

Turning now to the drawings, FIG. 3 is a block diagram illustrating some components of a communications system 30 configured according to one embodiment of the present disclosure. As seen in FIG. 3, the communications system 30 comprises an IP communications network 32 that communicatively connects a plurality of different domain entities 34, 36, 38, a mobile device 40 and a workstation 44, each of which may be considered user-level domain entities, and Policy Consistency and Enforcement Node (PCEN) 50. The IP communications network may comprise, for example, any public or private IP-based network that communicates data in packets between devices connected to the IP network 32. A wireless communications network 42 comprising a base station or other access point facilitates the communication of data and signals between the mobile device 40 and the IP network 32, as is known in the art. Although not specifically shown, workstation 44 may also connect to the IP network 32 via a wireless interface, or via an Ethernet connection, as is known in the art.

Each of the domain entities 34, 36, 38 comprises one or more computer servers, and defines a set of rules that control the behavior of a user device, such as mobile device 40, under certain predetermined conditions. More particularly, the rules define actions to be performed by mobile device 40 whenever mobile device 40 detects certain predetermined events. By way of example, a manufacturer domain entity 34 may define a rule that causes the mobile device 40 to shut down whenever it detects that a user has depressed the power button for a predefined length of time. A government domain entity 36 may define a "hands free" rule that causes certain communications functions to be enabled and/or disabled whenever the mobile device 40 detects that it is moving in a vehicle. A company domain entity 38 may define a rule that disables the user's ability to access certain predetermined web sites, or to communicate to certain predetermined numbers. Additionally, the user of the mobile device 40, as a user domain entity, may define a rule that controls which ringtone to render upon receiving an incoming call from a remote party. These same rules, or different rules, may be generated and used to control the behavior of workstation 44 in a similar manner.

In one embodiment of the present disclosure, each of the domain entities 34, 36, 38, as well as mobile device 40, communicate their respective rules to PCEN 50, which may comprise a computer server, for example. Upon receiving the rules, the PCEN 50, first determines whether some or all of the rules conflict with one another based on the predetermined priority levels of the different domain entities 34, 36, 38, and mobile device 40. The PCEN 50 then generates an integrated policy for the mobile device 40 using those rules if no conflicts are found to exist.

More particularly, as defined in more detail later, the PCEN 50 is configured to determine which of the domain entities 34, 36, 38, and mobile device 40 have the higher priority level. Based on that determination, the PCEN 50 prioritizes the rules received from the domain entities 34, 36, 38, and mobile device 40. The PCEN 50 then checks the rules associated with the domain entities having a lower priority level against the rules associated with the domain entities having a higher priority level to ensure that the rules do not conflict with one another. If no conflict exists, the rules are used to generate an integrated policy for the mobile device 40. However, if a conflict between the rules does exist, then only the rules associated with the higher priority domain entity will be used in generating the integrated policy. Once the PCEN 50 has completed generating the integrated policy, the PCEN 50 loads the integrated policy into the memory of the mobile device 40 to control the behavior of the mobile device 40.

Figure 4:
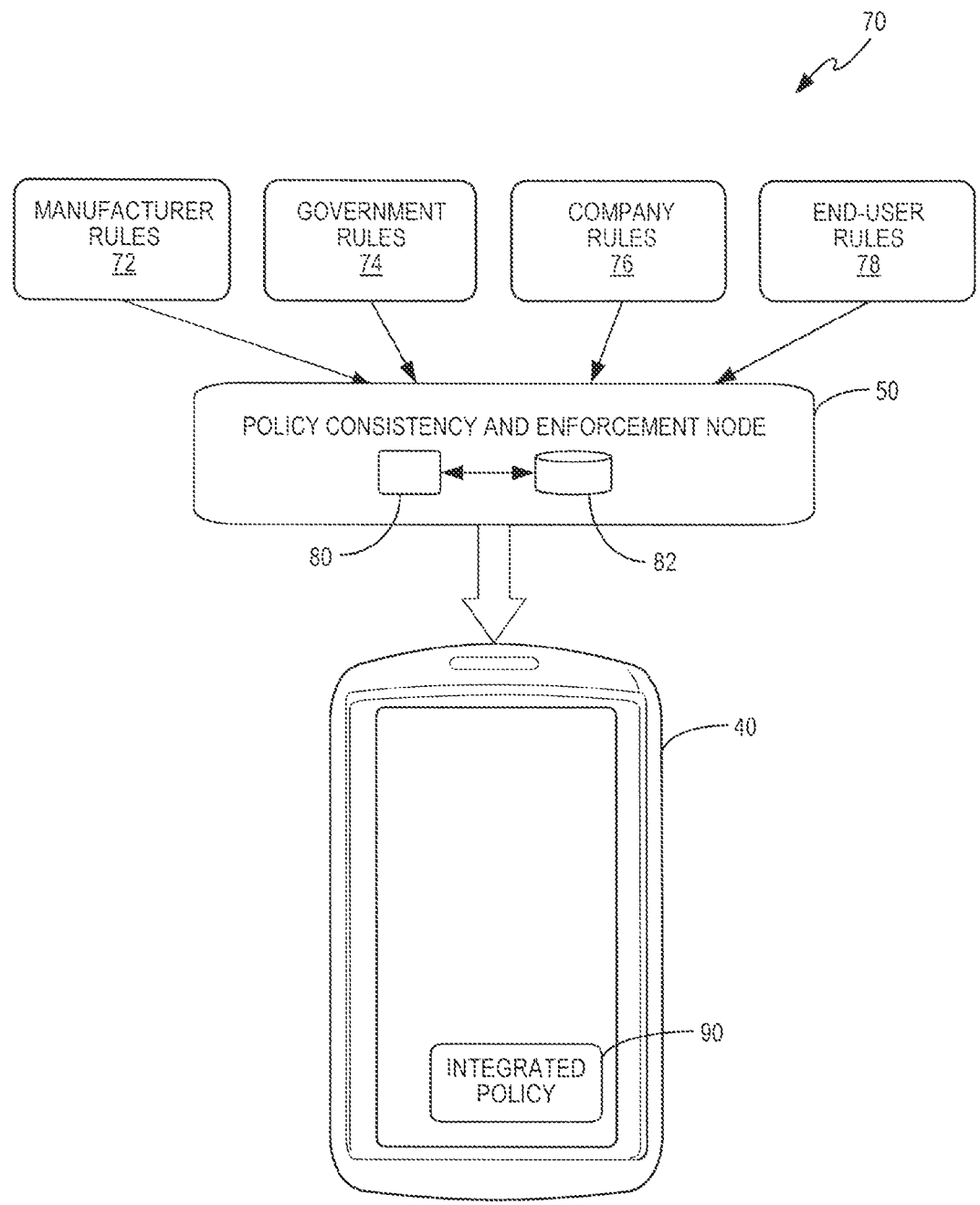
FIG. 4 is a block diagram illustrating the generation of an integrated policy according to one embodiment.

FIG. 4 is a block diagram illustrating a system 70 for the generation of an integrated policy based on the rules provided by the different domain entities 34, 36, 38, and mobile device 40 according to one embodiment. As seen in FIG. 4, each domain entity 34, 36, 38, and mobile device 40, which represents a user domain entity, has a respective associated set of rules 72, 74, 76, and 78. As previously stated, the rules 72, 74, 76, and 78 define actions that are to be performed by the mobile device 40 responsive to detecting an occurrence of a predefined event.

In operation, the rules 72, 74, 76, and 78 are generated by the respective domain entities 34, 36, 38, and mobile device 40, and then sent to the PCEN 50 via IP network 32. Upon receipt, a control application 80 executing at the PCEN 50 prioritizes the rules 72, 74, 76, and 78 according to the priority level of their corresponding domain entity 34, 36, 38, and mobile device 40. Once prioritized, the control application 80 checks each rule associated with a domain entity having a lower priority against the rules associated with the domain entities having a higher priority to determine whether a conflict exists. If a conflict exists, only the rule associated with the domain entity having the higher priority level is used to generate the integrated policy 90. If no conflict exists, however, both rules are used to generate the integrated policy 90. Once generated, the integrated policy 90 may be stored in a knowledge base 82, as well as downloaded to the mobile device 40 for storage in its memory.

Figure 5:
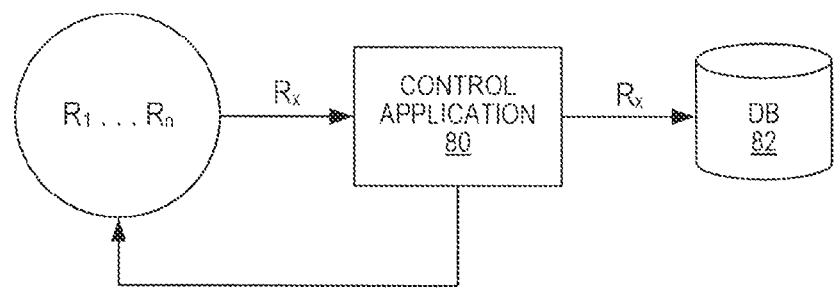
FIG. 5 is a block diagram illustrating a method of checking for conflicts between rules according to one embodiment.

FIG. 5 is a block diagram illustrating how the control application 80 checks for conflicts between the rules provided by the domain entities 34, 36, 38 and mobile device 40 according to one embodiment. As seen in FIG. 5, a domain entity that wants to control or modify the behavior of mobile device 40, such as domain entity 34, for example, provides one or more rules $R_1 \ldots R_n$ to the PCEN 50 using, for example, the functions and methods defined in an Application Programming Interface (API). Each rule provided to the PCEN 50 may be formed in any known manner, but in at least one embodiment, are formed as well-known "if-then" rules.

Initially, the control application 80 simply stores the first received rule $R_1$ in the knowledge base 82 as Rules R. Thereafter, for each subsequent rule $R_x$, the control application 80 creates a product of the received rule $R_x$ and the Rules R already existing in the knowledge base 82 as $R_x * R$, and checks the rule $R_x$ to ensure that it does not conflict with any of the rules in Rules R. For example, a conflict may be a situation where rule $R_x$ and any of the rules in Rules R specify different inconsistent actions for the mobile device 40 upon detecting the same predetermined event. If no conflicts are detected, rule $R_x$ is added to the set of Rules R, which in turn, is saved to the knowledge base 82 and utilized to generate the integrated policy 90. If a conflict does occur, rule $R_x$ is not added to Rules R, but instead, an operator at the domain entity that provided the rules is notified of the error. This process continues until all the rules provided by the domain entity are processed and checked.

Thereafter, when a domain entity wishes to modify one of its rules $R_x$ in Rules R, or if another domain entity wishes to add a rule $R_x$ to Rules R, the control application 80 retrieves the Rules R from the knowledge base. The control application then creates a product of the rules $R_x * R$, and checks the rule $R_x$ to ensure that it does not conflict with any of the rules in Rules R. As above, Rules R is modified according to rule $R_x$ if no conflict exists. However, if a conflict is detected, Rules R is not modified and the operator is notified.

The method of the present disclosure may be utilized in many different types of industries and vertical market sectors. Consider, for example, the telecommunications sector in which a piece of telecommunications equipment is controlled using an integrated policy P comprised of a set of Rules M. The manufacturer of the equipment may design the equipment to notify an operator every time the equipment detects an alarm condition. Therefore, the manufacturer could define a rule $M_1$ as (if "an alarm is detected") then ("notify operator"). Initially, there would be no conflicts between the rules because the set of Rules M would be empty. Therefore, the control application 80 would simply store the rule $M_1$ in the knowledge base 82 as Rules M.

A second domain entity, such as the government of the geographical area where the equipment is installed, may require that a description of every alarm detected by the equipment be logged in a log file. To this end, the government could create a rule $M_2$ as (if "alarm detected") then ("log alarm description to file"), and input rule $M_2$ into control application 80. Upon receipt, control application 80 retrieves Rules M from the knowledge base 82, generates a product of $M_2 * M$, and determines whether rule $M_2$ conflicts with any of the rules already in Rules M. If not, rule $M_2$ is added to Rules M such that Rules M now comprises $M_1 * M_2$ (if "alarm detected") then ("log alarm description to file and notify operator"). Rules M is then stored back into the knowledge base 82. If a conflict exists, rule $M_2$ is not added to Rules M, and the operator is notified of the conflict.

A third domain entity, such as the operator of the equipment, may want to control the equipment to forego notification upon detecting an error. In such cases, the operator may define a rule $M_3$ as (if "alarm detected") then ("do not notify operator"). As above, control application 80 would retrieve the set of Rules M from the knowledge base 82 upon receiving rule $M_3$, and determine whether rule $M_3$ contradicts any of the rules $M_1$ and $M_2$ that are already in Rules M. In this case, rule $M_3$ (i.e., do not notify operator upon detecting an alarm) conflicts with the already existing rule $M_1$ (i.e., notify operator upon detecting alarm). However, the domain entity 34 (i.e., the manufacturer) that provided rule $M_1$ has a higher priority level than the domain entity (i.e., the equipment operator). Thus, rule $M_3$ would not be added to Rules M. Instead, Rules M would remain as $M_1 * M_2$ and be utilized to generate the integrated policy 90 that will control the behavior of the equipment.

As stated previously, the control application 80 executes at the PCEN 50 in the network. Such centralization allows the control application 80 to address several challenges not currently recognized or handled by conventional policy generation systems. Particularly, the control application 80 provides consistency in the rules between different priority levels when generating an integrated policy 90. Thus, the control application 80 is configured to prevent rules associated with a lower priority domain entity from overwriting rules associated with a domain entity having a higher priority level. Such is also the case when the control application 80 is updating an existing integrated policy 90 stored in the knowledge base 82 with a new rule or a modified rule. Specifically, the centralized control application 80 ensures that the new or modified rule does not conflict with any of the existing rules already in the integrated policy 90, thereby allowing each of the already existing rules to remain consistent.

The present disclosure also recognizes that the rules in the integrated policy 90 should be checked whenever a device, such as mobile device 40, moves into a new geographical area. For example, consider a hospital that is moving its operations from a first jurisdiction to a second jurisdiction—each jurisdiction having a different government entity that defines the restrictions and rules governing the operation of the equipment. In such scenarios, the rules in the integrated policy 90 provided by government entity for the first jurisdiction may no longer be valid for the second jurisdiction. Therefore, the integrated policy 90 may need to be updated to incorporate the rules provided by the government entity for the second jurisdiction.

Therefore, in accordance with one or more embodiments, the control application 80 updates a current integrated policy 90 for a device with the rules provided by the government entity associated with the new jurisdiction. Particularly, the control application 80 receives the new rules defined by government entity of the new jurisdiction, and compares the new rules to those already existing in integrated policy 90. So long as none of the rules contradict each other, the new rule is added to the integrated policy 90. However, if any of the rules contradict each other, only the rule associated with the domain entity having the higher priority level is maintained in, or added to, the integrated policy 90.

Thus, embodiments of the present disclosure provide a centralized network-based node—i.e., the PCEN 50—that ensures the consistency of the integrated policies when they are created or modified. Particularly, multiple different domain entities express their own policies, rules, or constraints in the form of "if-then" rules to the PCEN 50. The PCEN 50 then links all of the rules together using a timeline to enforce the rules.

In another example, consider a manufacturer that develops medical equipment for monitoring a patient. The manufacturer may define a rule $M_1$ to generate an alarm whenever a patient's body temperature rises above 101° F. (i.e., if ("patient's temperature exceeds 101° F.") then ("generate an alarm")). However, hospital personnel may decide to create a rule $M_2$ that specifies alerting medical personnel only if the patient's temperature exceeds 102° F. (i.e., if ("patient's temperature exceeds 102° F.") then ("generate an alarm"). While checking the rules $M_1$ and $M_2$, control application 80 would determine that rules $M_1$ and $M_2$ conflict with each other and are inconsistent, and further, that the manufacturer has the higher priority level. Therefore, control application 80 would add only rule $M_1$ to the set of Rules M and store it to the knowledge base 82.

In another telecommunications market example, consider a cellphone manufacturer that wishes to control the security of the device by requiring a PIN whenever a user unlocks the device. In such an embodiment, the manufacturer may define a default rule $M_1$ as (if "the phone transitions from a locked state to an unlocked state") then ("prompt the user to enter a 4-digit PIN before moving to the unlocked state"). Thereafter, a vendor selling the device to end users may wish to override this default setting by requiring no PIN. Therefore, the vendor may create a rule $M_2$ as (if "the phone transitions from a locked state to an unlocked state") then ("do not prompt the user for a PIN"). Upon retrieving Rules M from the knowledge base 82, the control application 80 would detect the conflict between rules $M_1$ and $M_2$. In this case, however, control application 80 would also determine whether the vendor has a higher priority level than the manufacturer, and if so, control application 80 would overwrite existing rule $M=M_1$ as $M=M_2$ and store it in the knowledge base 82.

Thereafter, a user of the device may want to set the PIN. Therefore, the user may create a rule $M_3$ as (if "the phone transitions from a locked state to an unlocked state") then ("prompt the user to enter a 6-digit PIN before moving to the unlocked state and delete the contents of the device memory after detecting 8 failed attempt"). In this case, the control application 80 would retrieve the set of Rules M, which at this point comprises only rule $M_2$, and check rule $M_3$ against rule $M_2$ to determine whether the rules conflict. Additionally, the control application 80 would determine whether the end user had a higher priority level than that of the vendor, and if so, would overwrite the rule $M_2$ in the set of Rules R with the rule $M_3$ provided by the user and store the modified Rules R in the knowledge base.

Figure 6:
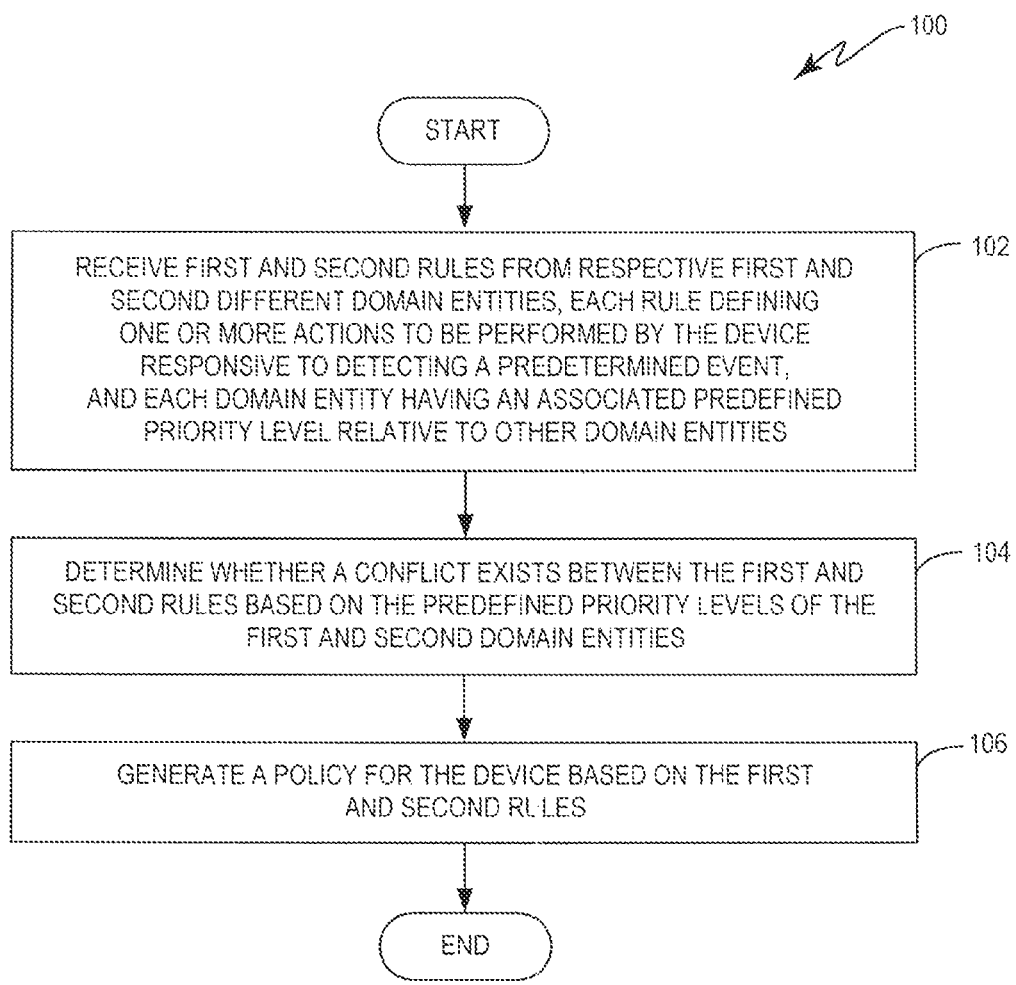
FIG. 6 is a flow diagram illustrating a method of generating a policy for a device according to one embodiment.

FIG. 6 is a flow diagram illustrating a method 100 for generating an integrated policy 90 for a mobile device 40 using the rules provided by the domain entities 34, 36, 38, and the mobile device 40, according to one embodiment. Method 100, which is performed by the PCEN 50, begins with the PCEN 50 receiving a first rule from a first domain entity 34, such as the manufacturer, and a second rule from a second domain entity 36, such as a government entity. As stated above, each domain entity 34, 36 has an associated priority level, and each of the first and second rules define one or more actions to be performed by the mobile device 40 responsive to detecting a predetermined event (box 102).

Upon receiving the first and second rules, the PCEN 50 determines whether a conflict exists between the first and second rules based on the predefined priority levels of the first and second domain entities (box 104). The PCEN 50 then generates an integrated policy 90 based on the first and second rules (box 104). As stated above, both rules are used to generate the integrated policy if no conflict exists. However, if a conflict exists, only the rule associated with the domain entity having the higher priority level is utilized to generate the integrated policy. The rule associated with the domain entity having the lower priority level is dropped.

Figure 7:
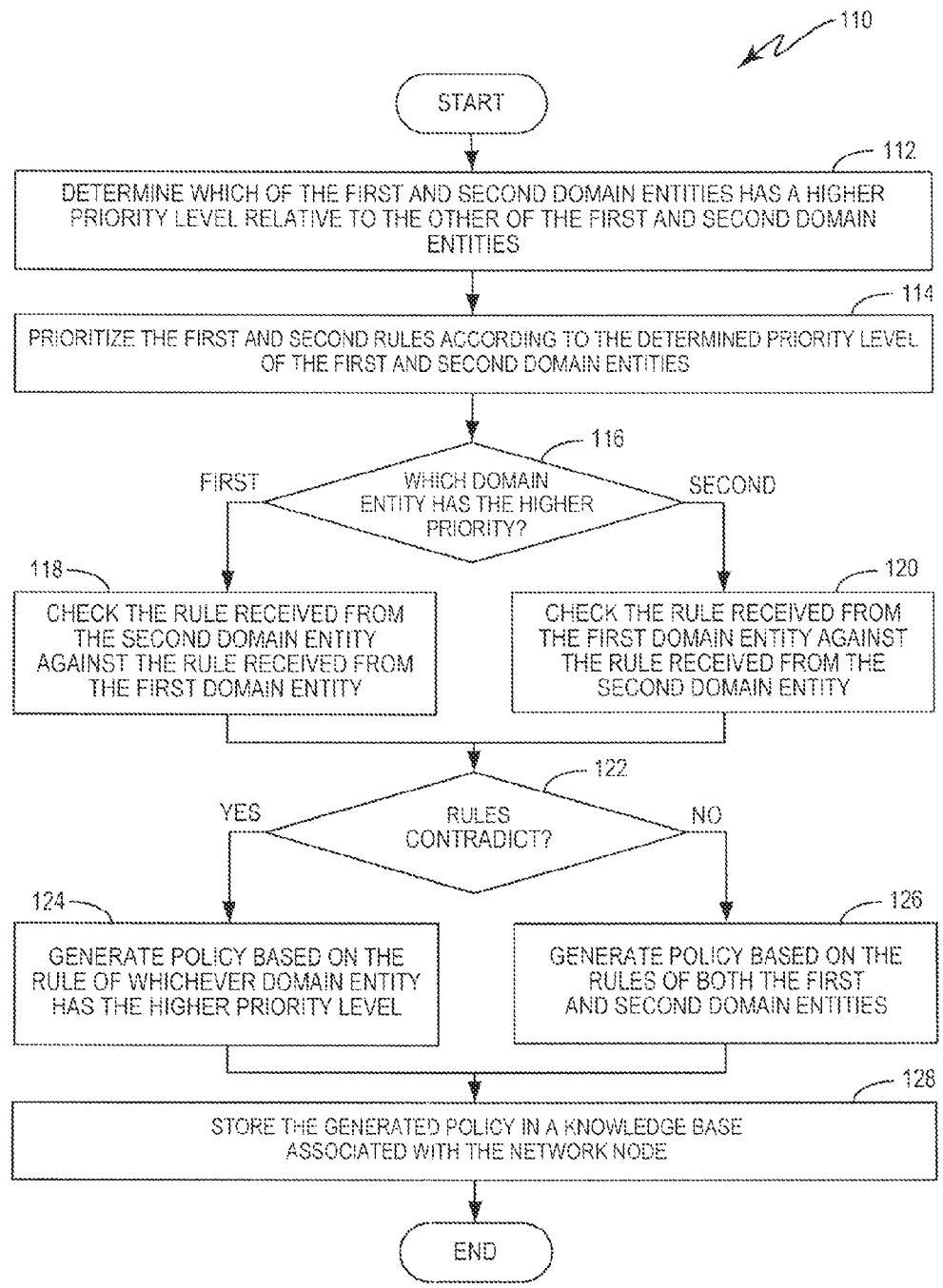
FIG. 7 is a flow diagram illustrating a method of generating a policy for a device according to another embodiment.

FIG. 7 is a flow diagram illustrating a method 110 of generating integrated policy 90 for mobile device 40 in more detail. As above, method 110 is performed by the PCEN 50. It is assumed that the PCEN 50 has already received the first and second rules from the domain entities (e.g., domain entities 34 and 36, respectively).

Method 110 begins with the PCEN 50 determining which of the first and second domain entities has the higher priority level relative to the other of the first and second domain entities (box 112). The PCEN 50 then prioritizes the first and second rules according to that determined priority level (box 114). Then, PCEN 50 checks the first and second rules against each other depending on which domain entity has the higher priority (box 116). More specifically, if the first domain entity has the higher priority level, then the PCEN 50 checks the rule received from the second domain entity against the rule received from the first domain entity (box 118). If, however, the second domain entity has the higher priority level (box 116), the PCEN 50 checks the rule received from the first domain entity against the rule received from the second domain entity (box 120). Thus, the rule received from the domain entity that has the lower of the priority levels is checked against the rule received from the domain entity that has the higher of the two priority levels.

The comparison allows the PCEN 50 to determine whether the first and second rules conflict with each other (box 112). If there is a conflict (box 122), the PCEN 50 generates the integrated policy using rule received from whichever of the first and second domain entities has the higher priority level (box 124). If there is no conflict between the rules (box 122), the PCEN 50 generates the integrated policy 90 using both of the first and second rules (box 126). The PCEN 50 continues this process until all received rules are processed, and then stores the integrated policy in knowledge base 82 (box 128).

Figure 8:
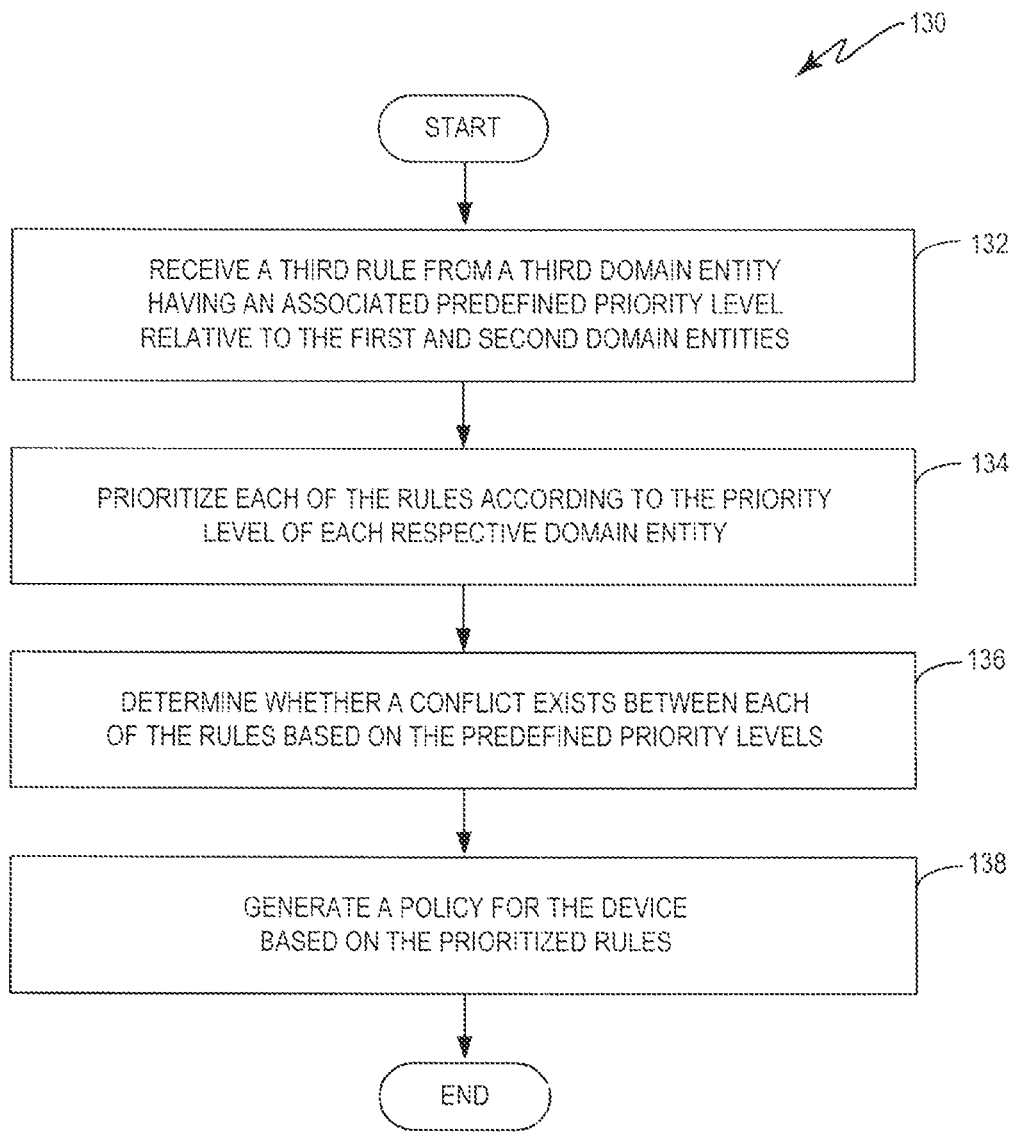
FIG. 8 is a flow diagram illustrating a method of modifying an existing policy with one or more new rules according to one embodiment.

FIG. 8 is a flow diagram illustrating a method 130 of modifying an existing integrated policy 90 with one or more new rules according to one embodiment of the present disclosure. Method 130, which is also performed at the PCEN 50, assumes that the first and second rules are already contained within the integrated policy 90.

Method 130 begins with the PCEN 50 receiving a rule from a third domain entity (box 132). As above, the third domain entity (e.g., domain entity 38) has an associated priority level relative to the priority levels of the first and second domain entities. In accordance with method 130, the PCEN 50 retrieves the integrated policy 90, prioritizes the first, second, and third rules in accordance with the priority levels of their respective domain entities (box 134), and then determines whether a conflict exists between each of the first, second, and third rules by checking the third rule against each of the first and second rules (box 136). Based on whether a conflict exists, PCEN 50 then generates or updates the integrated policy 90.

Figure 9:
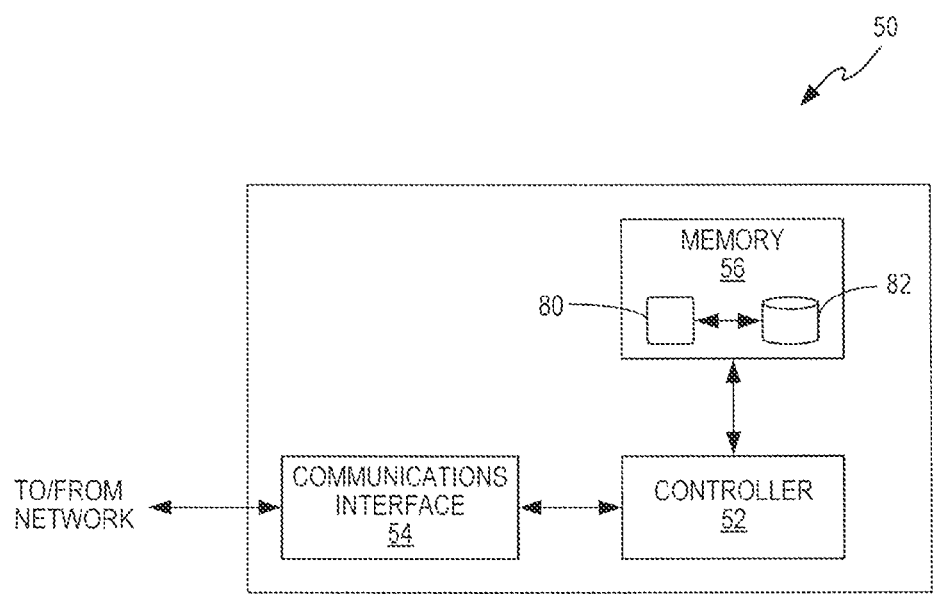
FIG. 9 is a block diagram illustrating some components of a network node configured according to one embodiment.

FIG. 9 is a block diagram illustrating some components of a PCEN 50 configured according to one embodiment. As seen in FIG. 8, the PCEN 50 comprises a programmable controller 52 operatively connected to a communications interface 54 and a memory 56. As those of ordinary skill in the art will appreciate, other components may also comprise the PCEN 50, although they are not explicitly shown here.

The communications interface 54 may, for example, comprise an Ethernet card or similar piece of hardware that communicatively couples the PCEN 50 to the IP network 32. Generally, information and data are transmitted to mobile device 40, or some other remote device, as packets via the communications interface 54 according to the well-known TCP/IP protocol; however, any protocol needed or desired may be used to communicate data in accordance with the present disclosure. Memory 56 may comprise any solid state memory or computer readable media known in the art. Suitable examples of such media include, but are not limited to, ROM, DRAM, Flash, or a device capable of reading computer-readable media, such as optical or magnetic media.

The programmable controller 52 controls the operation of the PCEN 50 in accordance with one or more known standards. The functions of controller 52 may be implemented by one or more microprocessors, hardware, firmware, or a combination thereof. As detailed previously, the controller 52 is configured to perform the functions necessary to generate an integrated policy for an end-user device, such as mobile device 40 and workstation 44, based on the rules provided by one or more domain entities. Thus, the controller 52 may be configured, when executing the control application 80 stored in memory 56, to receive one or more rules from one or more domain entities via interface 54, prioritize those rules 90 in accordance with their corresponding domain entity, and generate an integrated policy 90 based on those prioritized rules. Integrated policies 90 are also saved to a knowledge base 82, as previously stated.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein

What is claimed is:

1. A method for generating policies for a mobile device, the method performed at a network node coupled to a communication network wherein the network node is remote from the mobile device, and comprising:

receiving at the network node first and second rules over the communication network from respective first and second different domain entities coupled to the communication network, each rule defining one or more actions to be performed by the mobile device responsive to detecting a predetermined event at the mobile device, and each domain entity having an associated predefined priority level relative to other domain entities;

determining at the network node whether a conflict exists between the first and second rules based on the predefined priority levels of the first and second domain entities;

responsive to determining a conflict exists, generating at the network node a policy for the mobile device based on the first and second rules and the predefined priority levels;

communicating the policy from the network node through an access point over a wireless interface to the mobile device to control the mobile device during the predetermined event;

determining at the network node that the mobile device has moved into a new geographic area;

determining at the network node whether a new domain entity is associated with the geographic area;

responsive to determining the new domain entity is associated with the geographic area, generating an updated policy with a new rule from the new domain entity after having determined that the new rule does not conflict with the first rule and the second rule; and communicating the updated policy from the network node through an access point over a wireless interface to the mobile device.

2. The method of claim 1 wherein determining whether a conflict exists comprises:

determining which of the first and second domain entities has a higher priority level relative to the other of the first and second domain entities;

prioritizing the first and second rules according to the determined priority level of the first and second domain entities; and generating the policy based on the prioritized first and second rules.

3. The method of claim 1 wherein determining whether a conflict exists between the first and second rules based on the predefined priority levels of the first and second domain entities comprises checking one of the first and second rules received from one the first and second domain entities having a lower priority level against one of the first and second rules received from one the first and second domain entities having a higher priority level.

4. The method of claim 3 wherein a conflict is determined to exist responsive to one of the first and second rules received from one the first and second domain entities having the lower priority level contradicts the rule received from one of the first and second rules received from one the first and second domain entities having the higher priority level.

5. The method of claim 2 wherein if a conflict exists between the first and second rules, generating the policy based on the prioritized first and second rules comprises:
    generating the policy based on the first rule if the first domain entity has a higher priority level than the second domain entity; and
    generating the policy based on the second rule if the second domain entity has a higher priority level than the first domain entity.

6. The method of claim 1 further comprising:
    receiving a third rule from a third domain entity coupled to the communication network having an associated predefined priority level relative to the first and second domain entities;
    prioritizing each of the first, second, and third rules according to the priority level of each respective domain entity;
    determining whether a conflict exists between each of the first, second, and third rules based on the predefined priority levels;
    updating the policy for the device based on the prioritized first, second, and third rules; and
    communicating the policy based on the prioritized first, second, and third rules from the network node through an access point over a wireless interface to the mobile device to control the mobile device during the predetermined events.

7. The method of claim 1 further comprising storing the generated policy in a knowledge base associated with the network node.

8. A network node coupled to a communication network for generating policies for a mobile device remote from the network node, the network node comprising:
    a communications interface configured to receive first and second rules over the communication network from respective first and second different domain entities coupled to the communication network, each rule defining one or more actions to be performed by the mobile device responsive to detecting a predetermined event at the mobile device, and each domain entity having an associated predefined priority level relative to other domain entities; and
    a programmable processor configured to:
        determine whether a conflict exists between the first and second rules based on the predefined priority levels of the first and second domain entities;
        responsive to a determination the conflict exits, generate a policy for the mobile device based on the first and second rules and the predefined priority levels;
        communicate the policy from the network node through an access point over a wireless interface to the mobile device to control the mobile device during the predetermined event;
        determine that the mobile device has moved into a new geographic area;
        determine whether a new domain entity is associated with the geographic area;
        generate an updated policy with a new rule from the new domain entity after having determined that the new rule does not conflict with the first rule and the second rule responsive to determining the new domain entity is associated with the geographic area; and
        communicate the updated policy from the network node through an access point over a wireless interface to the mobile device.

9. The network node of claim 8 wherein to determine whether a conflict exists, the programmable processor is configured to:
    determine which of the first and second domain entities has a higher priority level relative to the other of the first and second domain entities; and
    prioritize the first and second rules according to the determined priority level of the first and second domain entities; and
    generate the policy based on the prioritized first and second rules.

10. The network node of claim 8 wherein to determine whether a conflict exists, the programmable processor is configured to check one of the first and second rules received from one the first and second domain entities having a lower priority level against one of the first and second rules received from one the first and second domain entities having a higher priority level.

11. The network node of claim 10 wherein the programmable processor determines that a conflict exists if one of the first and second rules received from one the first and second domain entities having the lower priority level contradicts the rule received from one of the first and second rules received from one the first and second domain entities having the higher priority level.

12. The network node of claim 9 wherein if a conflict exists between the first and second rules, the programmable processor is configured to:
    generate the policy based on the first rule if the first domain entity has a higher priority level than the second domain entity; and
    generate the policy based on the second rule if the second domain entity has a higher priority level than the first domain entity.

13. The network node of claim 8 wherein the communications interface is further configured to receive a third rule from a third domain entity coupled to the communication network having an associated predefined priority level relative to the first and second domain entities, and wherein the processor is further configured to:
    prioritize each of the first, second, and third rules according to the priority level of each respective domain entity;
    determine whether a conflict exists between each of the first, second, and third rules based on the predefined priority levels; and
    update the policy for the mobile device based on the prioritized first, second, and third rules; and
    communicating the policy based on the prioritized first, second, and third rules from the network node through an access point over a wireless interface to the mobile device to control the mobile device during the predetermined events.

14. The network node of claim 8 further comprising a memory configured to store the generated policy in a knowledge base.

15. A non-transitory computer readable medium configured to store program instructions thereon that, when executed by a processor at a network node, configures the network node to:
receive at the network node coupled to a communication network first and second rules over the communication network from respective first and second different domain entities coupled to the communication network, each rule defining one or more actions to be performed by a mobile device responsive to detecting a predetermined event at the mobile device, and each domain entity having an associated predefined priority level relative to other domain entities;
determine at the network node whether a conflict exists between the first and second rules based on the predefined priority levels of the first and second domain entities;
responsive to the determination a conflict exists, generate at the network node a policy for the mobile device based on the first and second rules and the predefined priority levels; and
communicate the policy from the network node through an access point over a wireless interface to the mobile device to control the mobile device during the predetermined event;
determine at the network node that the mobile device has moved into a new geographic area;
determine at the network node whether a new domain entity is associated with the geographic area;
generate an updated policy with a new rule from the new domain entity after having determined that the new rule does not conflict with the first rule and the second rule responsive to determining the new domain entity is associated with the geographic area; and
communicate the updated policy from the network node through an access point over a wireless interface to the mobile device.

16. The non-transitory computer readable medium of claim 15 wherein to determine whether a conflict exists, the program instructions, when executed by the processor, causes the network node associated with the processor to:
determine which of the first and second domain entities has a higher priority level relative to the other of the first and second domain entities;
prioritize the first and second rules according to the determined priority level of the first and second domain entities; and
generate the policy based on the prioritized first and second rules.

17. The non-transitory computer readable medium of claim 15 wherein to determine whether a conflict exists, the program instructions, when executed by the processor, causes the network node associated with the processor to check one of the first and second rules received from one the first and second domain entities having a lower priority level against one of the first and second rules received from one the first and second domain entities having a higher priority level.

18. The non-transitory computer readable medium of claim 16 wherein the program instructions, when executed by the processor, causes the network node associated with the processor to determine that a conflict exists if one of the first and second rules received from one the first and second domain entities having the lower priority level contradicts the rule received from one of the first and second rules received from one the first and second domain entities having the higher priority level.

19. The non-transitory computer readable medium of claim 16 wherein if a conflict exists, the program instructions, when executed by the processor, causes the network node associated with the processor to:
generate the policy based on the first rule if the first domain entity has a higher priority level than the second domain entity; and
generate the policy based on the second rule if the second domain entity has a higher priority level than the first domain entity.

20. The non-transitory computer readable medium of claim 15 wherein the program instructions, when executed by the processor, causes the network node associated with the processor to:
receive at the network node a third rule from a third domain coupled to the communication network entity having an associated predefined priority level relative to the first and second domain entities;
prioritize each of the first, second, and third rules according to the priority level of each respective domain entity;
determine whether a conflict exists between each of the first, second, and third rules based on the predefined priority levels;
update the policy for the mobile device based on the prioritized first, second, and third rules; and
communicating the policy based on the prioritized first, second, and third rules from the network node through an access point over a wireless interface to the mobile device to control the mobile device during the predetermined events.

21. The method of claim 1, wherein generating the updated policy comprises:
determining at the network node whether a conflict exists between the first and second rules and the new rule based on the predefined priority levels of the first, second, and new domain entities; and
responsive to determining a conflict exists, generating the updated policy for the mobile device based on the first, second, and new rules and the predefined priority levels.

22. The method of claim 1, further comprising
receiving at the network node a third rule from the mobile device;
wherein determining comprises determining at the network node whether a conflict exists between the first, second, and third rules;
wherein generating comprises generating at the network node a policy for the mobile device based on the first, second, and third rules.

* * * * *